United States Patent [19]

Dickes

[11] 4,131,048
[45] Dec. 26, 1978

[54] WORKPIECE AND WORK TOOL CUTTING JIG

[76] Inventor: Roger D. Dickes, 15415 Lima Rd., Huntertown, Ind. 46748

[21] Appl. No.: 819,299

[22] Filed: Jul. 27, 1977

[51] Int. Cl.² .............................................. B27B 11/04
[52] U.S. Cl. ....................................... 83/745; 83/455
[58] Field of Search .................. 83/743, 745, 454, 455

[56] References Cited

U.S. PATENT DOCUMENTS

| 1,911,045 | 5/1933 | Tinnen ................................... 83/454 |
| 2,651,333 | 9/1953 | Spinney ............................ 83/454 X |
| 3,124,176 | 3/1964 | Vogini ............................. 83/745 X |

*Primary Examiner*—Willie G. Abercrombie
*Attorney, Agent, or Firm*—Gust, Irish, Jeffers & Rickert

[57] ABSTRACT

An elongate reference beam is affixed to longitudinally spaced supports at a working height. A reference stop is mounted for longitudinal adjustment along the beam and is typically placed near one end of the beam. A reference guide is mounted for longitudinal adjustment along the beam and is typically placed adjacent the other end of the beam. The stop has three cooperating faces forming a three dimensional corner: a horizontal face vertically supports a workpiece, such as an elongate wooden stud; a vertical face laterally disposed to the beam longitudinally positions one end of the workpiece; and a vertical face disposed substantially parallel to the beam laterally positions the one end of the workpiece from the beam. The guide has a vertical face disposed parallel to the beam for laterally spacing a side of the workpiece from the beam and a laterally extending arm having a laterally extending vertical side for laterally guiding a work tool, such as a portable power saw, in a cutting direction transverse to the workpiece to cut a predetermined workpiece length.

1 Claim, 6 Drawing Figures

WORKPIECE AND WORK TOOL CUTTING JIG

BACKGROUND OF THE INVENTION
1. Field of the Invention

This invention is in the field of jigs for positioning workpieces and guiding work tools for performing a work operation on the workpiece, and more particularly for positioning an elongate wooden member such as a stud, and for guiding a work tool such as a portable power saw.

2. Brief Description of the Prior Art

Numerous devices exist for positioning workpieces, such as wooden building materials, and for guiding a power saw to perform a cutting operation on the workpiece. These devices have generally been useful for holding a workpiece on a surface and providing a guide for the work tool but required pre-measuring of the workpiece prior to use of the work tool, especially when the workpiece is an elongate member such as a building stud. Further, since it is often necessary to cut or otherwise form the workpiece at a building site, the jig should be portable yet sturdy and rigid and capable of readily receiving and properly positioning a workpiece and work tool so that accurate lengths and angles of cut may be quickly achieved. This is especially desirable when a large number of workpieces are required, such as studs used in conventional buildings. It is further desired that the jig may be quickly and accurately adjusted to accomodate different lengths, and sizes or workpieces. The combination of the above advantages has not been heretofore achieved and the need and use area for some are widespread.

SUMMARY OF THE INVENTION

An elongate reference beam, which may be of a light metal material, having a polygonal cross-section is supported at longitudinally spaced points at a convenient working height by trestles such as commonly available saw horses. The beam is nailed or otherwise affixed to the supports. A reference stop is provided having a polygonal opening for slidably receiving one end of the beam with the sides of the stop being in sliding engagement with the sides of the beam to prevent relative rotation therebetween. The stop is provided with a three dimensional open corner having a vertical face laterally disposed relative the beam, a vertical face substantially parallel with the beam, and a horizontal face laterally extending from the beam. Thus, one end of a workpiece, such as a wooden building stud, is longitudinally positioned by the laterally extending vertical face is laterally positioned by the vertical parallel face; and is vertically positioned by the horizontal face. The stop is provided with one or more set screws which may be tightened against the beam for securing the stop at an adjustable longitudinal position along the beam.

A reference guide, also having a polygonal opening for slidably receiving the beam, with the polygonal sides of the opening and the beam being in sliding engagement to prevent relative rotation between the guide and the beam, has a vertical longitudinally disposed surface for lateral positioning of the workpiece and a laterally extending arm overlying the workpiece. The arm has a vertical laterally disposed surface for laterally guiding the work tool in a cutting action transversely of the workpiece. The guide has a set screw which is engageable with the beam for securing the guide at an adjustable position longitudinally of the beam.

The reference beam stop, and guide are a relatively lightweight, rigid material. The stop and guide cooperate with the supporting trestles to locate the workpiece in both a longitudinal and lateral direction, and provide a lateral surface against which the work tool may slide to provide an accurate cutting action both longitudinally and laterally of the workpiece. The reference beam may be easily disassembled form the trestles and transported to a building site, is exceptionally low in manufacturing cost and provides for easy and quick positioning and use of the work tool on the workpiece so that a high rate work operation may be accomplished. Further, the jig is readily adjusted to provide for different lengths of workpiece fabrication.

It is therefore and object of this invention to provide a jig which is low in manufacturing cost, is rugged in construction, and is easily transportable.

It is an object of this invention to provide a jig which provides for easy and quick lateral and longitudinal positioning of a workpiece and guiding of a work tool for use on the workpiece.

It is a further object of this invention to provide a device of the previous objects which provides workpiece fabrication with accurate lengthwise positioning and angle of work tool use.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
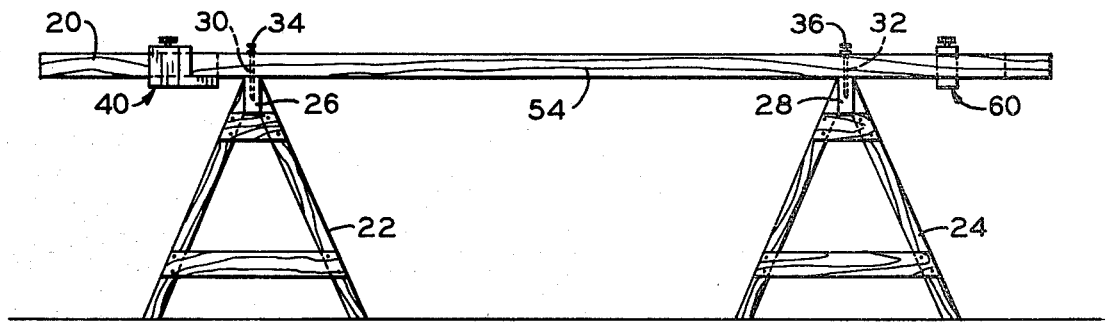
FIG. 1 is a side elevational view of a preferred embodiment of this invention having a workpiece positioned thereon.
Figure 2:
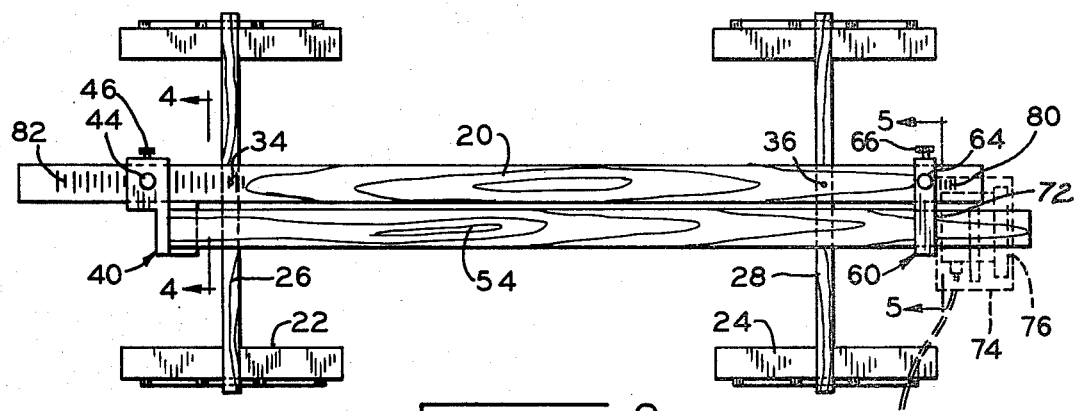
FIG. 2 is a top plan view of the embodiment of FIG. 1.
Figure 3:
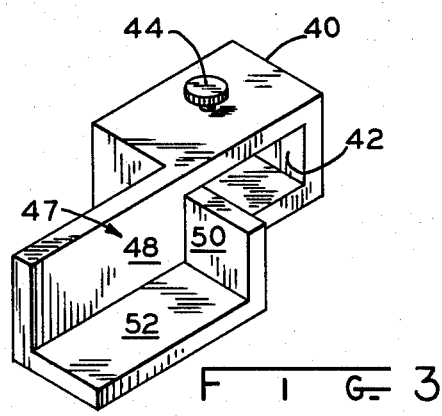
FIG. 3 is a view in perspective of the reference stop used in the embodiment of FIGS. 1 and 2.
Figure 4:
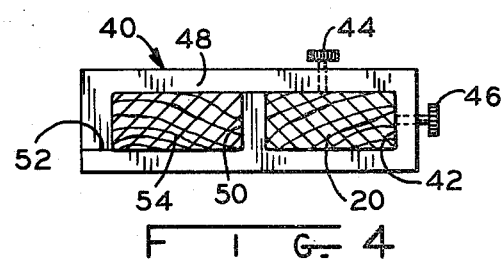
FIG. 4 is a section taken at 4—4 of FIG. 2.

Referring to the drawing, elongate reference beam 20 has an oblong cross section and is preferably made of a lightweight metal material such as aluminum or magnesium alloy, although it may be wood or other rigid material. Beam 20 is supported on trestles 22, 24 which have supporting cross members 26, 28, respectively, and are typically made of wood and are commonly known as "saw horses". Beam 20 has longitudinally spaced openings 30, 32 through which spikes 34, 36 respectively, are inserted and hammered into cross members 26, 28 respectively, thus affixing beam 20 to trestles 22, 24.

Reference stop 40, which may be made of a lightweight metal material such as aluminum or magnesium alloy, has a polygonal oblong opening 42 formed therein for slidably receiving the beam 20 with the surfaces of beam 20 being in sliding engagement with the surfaces of opening 42 preventing relative rotation between stop 40 and beam 20. Set screws 44, 46 are threadedly mounted in stop 40 and are threadedly tightened against beam 20 once stop 40 has been longitudinally positioned on beam 20 to thus firmly hold stop 40 in longitudinal adjustment on beam 20. Stop 40 has an open corner 47 formed of a vertical face 48 which is laterally disposed to beam 20, a vertical face 50 which is longitudinally disposed and substantially parallel to beam 20, and a horizontal face 52 which is laterally extending from beam 20. As will become apparent, face 48 provides endwise or longitudinal positioning of a workpiece 54, face 50 provides a lateral positioning of workpiece 54, and face 52 provides a vertical support for workpiece 54. Workpiece 54 is typically a "2 × 4" elongate wooden stud commonly used in building construction.

Figure 6:
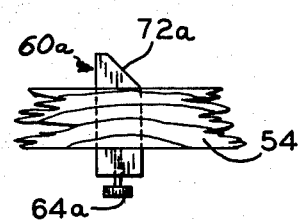
FIG. 6 is a partial side elevational view of a modified reference guide mounted on a supported beam.
Figure 5:
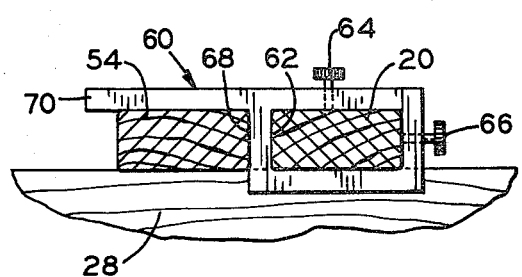
FIG. 5 is a section taken at 5—5 of FIG. 2.

A reference guide 60 has a polygonal oblong opening 62 formed therein which slidably receives beam 20 and the walls of beam 20 are in slidable engagement with the walls of opening 62 to prevent relative rotation between guide 60 and beam 20. Set screws 64, 66, which may be Allen head screws, are threadedly mounted in the walls of guide 60 and may be threadedly tightened against beam 20 after guide 60 is in proper longitudinal position on beam 20 to hold guide 60 firmly in longitudinal adjustment on beam 20. Guide 60 has a vertical longitudinally disposed surface 68 which is parallel to beam 20 and longitudinally aligned with surface 50. As will become apparent, surface 68 laterally positions workpiece 54. Guide 60 has an arm 70 which overlies workpiece 54 and has a vertical laterally extending surface 72 against which a work tool 74, shown in dashed lines, may laterally slide. Typically, tool 74 is a portable power saw manually held and which may be laterally slid along surface 72 to transversely cut workpiece 54 at the longitudinal position of saw blade 76. Guide 60 is positioned at a reference calibration 80 on beam 20 so that saw blade 76 clears the end of beam 20 after cuttng workpiece 54. Workpiece 54 is supported on the top surface of cross member 28 of trestle 24. Stop 40 may be positioned at a calibration 82 on beam 20 resulting in correspondingly cut lengths of workpiece 54. This is desirable since when workpiece 54 is to be used as a stud in conventional building construction, the required lengths vary according to the particular place and use of the stud in the construction. Also, it is frequently desirable to have a number of studs cut to the same exact length, a single positioning on beam 20 of stop 40 will result cutting studs to this length. The calibration 80 that is selected corresponds to the type of saw used. Once guide 60 has been properly set, stop 40 may be quickly moved to the desired calibration 82 for the workpiece 54 length desired. Referring to FIG. 6, guide surface 72a of guide 60a is at a 45° inclination to the vertical for guiding the work tool 76 to effect a 45° cut on workpiece 54; other angles may be used as desired. In this embodiment, set screw 64a is mounted beneath guide 60a. Also, since many commercially available saws have angularly adjustable blades, the angle of cut may be varied in this manner. Also, stop 40 and/or guide 60 may be related to beam 20 in a "mirror-image" to that shown in the drawing, and thusly be located on the laterally opposite side of beam 20 for any necessary work tool accomodation.

In operation of the embodiment shown in the drawing, the trestles 22 and 24 are positioned below the openings 30 and 32 in beam 20 and spikes 34 and 36 are inserted in vertical openings 30 and 32 and driven into wooden cross members 26 and 28 of trestles 22 and 24 respectively, leaving a sufficient area on cross member 28 for workpiece support. Guide 60 is then adjusted on beam 20 to a predetermined longitudinal position for the particular saw used, which may be indicated on calibrations 80, and set screws 60 and 62 are tightened against beam 20 to firmly hold guide 60 in longitudinally adjusted position. Stop 40 is then longitudinally adjusted, for example by using calibrations 82 on beam 20 and set screws 42 and 44 are tightened against beam 20 to firmly hold stop 40 in longitudinally adjusted position. An end of workpiece 54 is then placed in open corner 47 against faces 48, 50 and 52 of stop 40 to longitudinally, laterally and vertically position workpiece 54 relative beam 20. Workpiece 54 is positioned on the top surface of cross member 28 and against surface 68 of guide 60 for vertical and lateral positioning. Work tool 74 is then manually placed against lateral guide surface 72 of guide 60 and operated to cut workpiece 54 to a predetermined length. It is seen that numerous workpieces 54 may be quickly and accurately cut to length, with the angle of cut being uniform and determined by the angle and inclination of surface 72. Further, the device of this invention is light in weight and may be easily installed at work site location. When the work has been completed, disassembly is easily accomplished by removing spikes 34 and 36 for storing or transportation of the jig.

While there have been described above the principles of this invention in connection with specific apparatus, it is to be clearly understood that this description is made only by way of example and not as a limitation to the scope of the invention.

What is claimed is:

1. Jig apparatus comprising an elongate reference beam; a reference stop longitudinally adjustably mounted on said beam and having a laterally extending member for receiving and providing a reference surface for longitudinally positioning one end of a workpiece;
   first means for releasably holding said stop on said beam;
   a reference guide longitudinally adjustably mounted on said beam and having a laterally extending surface overlying the workpiece for guiding a work tool in reference to the workpiece;
   second means for releasably holding said stop on said beam;
   said stop has an opening for slidably receiving said beam and through which said beam extends;
   said stop reference surface being vertical and engageable by the one end of the workpiece for longitudinal positioning of the workpiece;
   said stop having a laterally extending horizontal surface underlying said workpiece for vertically supporting said workpiece;
   said stop having a vertical longitudinally aligned surface for laterally positioning a side of said workpiece.

* * * * *